Dec. 31, 1946.  J. B. TIEDEMANN  2,413,663
FLASH WELDING MACHINE
Filed Nov. 10, 1944  5 Sheets-Sheet 3

Julius B. Tiedemann
INVENTOR.

BY
ATTORNEY.

Dec. 31, 1946.    J. B. TIEDEMANN    2,413,663
FLASH WELDING MACHINE
Filed Nov. 10, 1944    5 Sheets-Sheet 4

Julius B. Tiedemann
INVENTOR.

BY [signature]
ATTORNEY.

Dec. 31, 1946.   J. B. TIEDEMANN   2,413,663
FLASH WELDING MACHINE
Filed Nov. 10, 1944    5 Sheets-Sheet 5
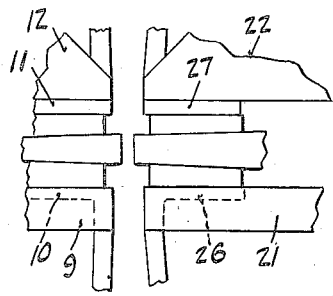
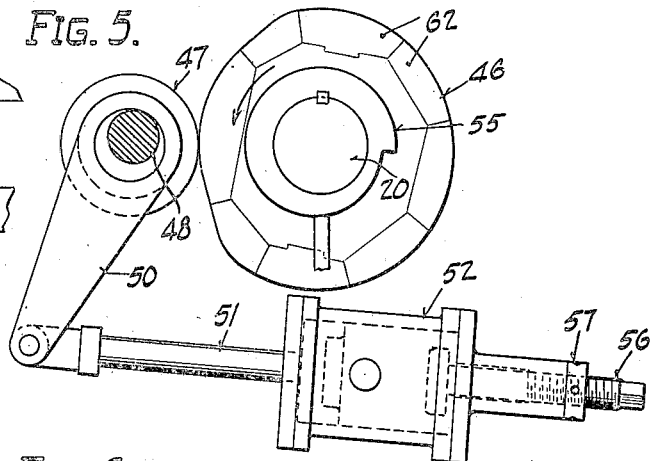
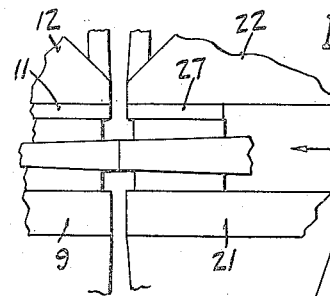
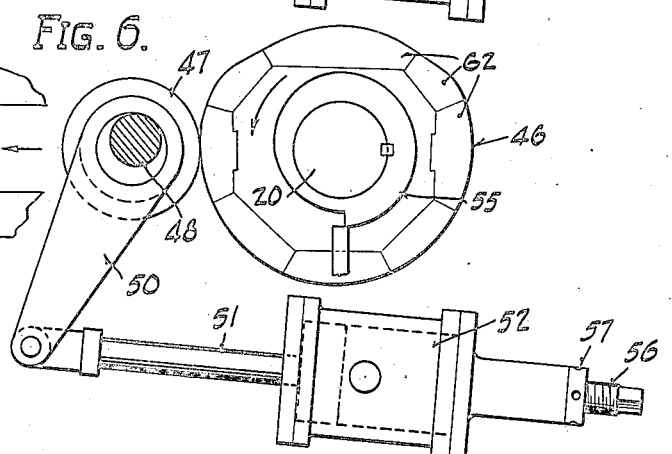
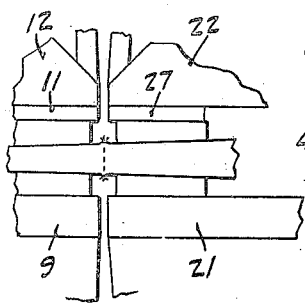
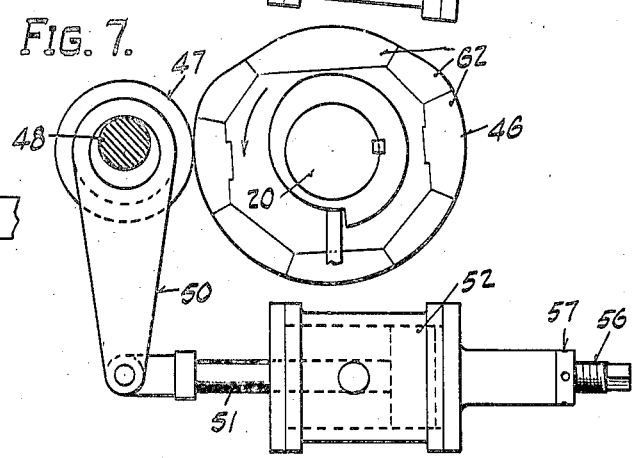
Julius B. Tiedemann
INVENTOR.
BY
ATTORNEY.

Patented Dec. 31, 1946

2,413,663

UNITED STATES PATENT OFFICE 2,413,663

FLASH WELDING MACHINE

Julius B. Tiedemann, Milwaukee, Wis., assignor to A. O. Smith Corporation, Milwaukee, Wis., a corporation of New York Application November 10, 1944, Serial No. 562,771

15 Claims. (Cl. 219—4)

This invention relates to a flash welding machine.

One of the objects of the invention is to provide a flash welding machine for electric flash welding large workpieces and in which the sides are open for the ready loading and unloading of the machine with the work loaded through one side and unloaded through the other side.

Another object is to provide improved construction for quickly applying the welding dies to the work and releasing the work therefrom.

Another object is to provide a compact and powerful pressure means for operating the sliding table to move the parts toward each other during flashing and final bump.

Another object is to provide an automatic cam pressure means for quickly upsetting the weld in the final stroke of the welding operation.

Another object is to provide for the automatic return of the sliding table upon release of the work from the welding dies.

Other objects and advantages will appear hereinafter in connection with the description of an embodiment of the invention illustrated in the accompanying drawings.

In the drawings:

Fig. 5 is a diagrammatic view showing the cams and welding dies in the position they assume at the beginning of a welding operation;

Fig. 6 is a view similar to Fig. 5 showing the parts in the position just prior to the final bump of the welding operation; and Fig. 7 is a view similar to Fig. 5 showing the parts after the final bump.

Figure 1:
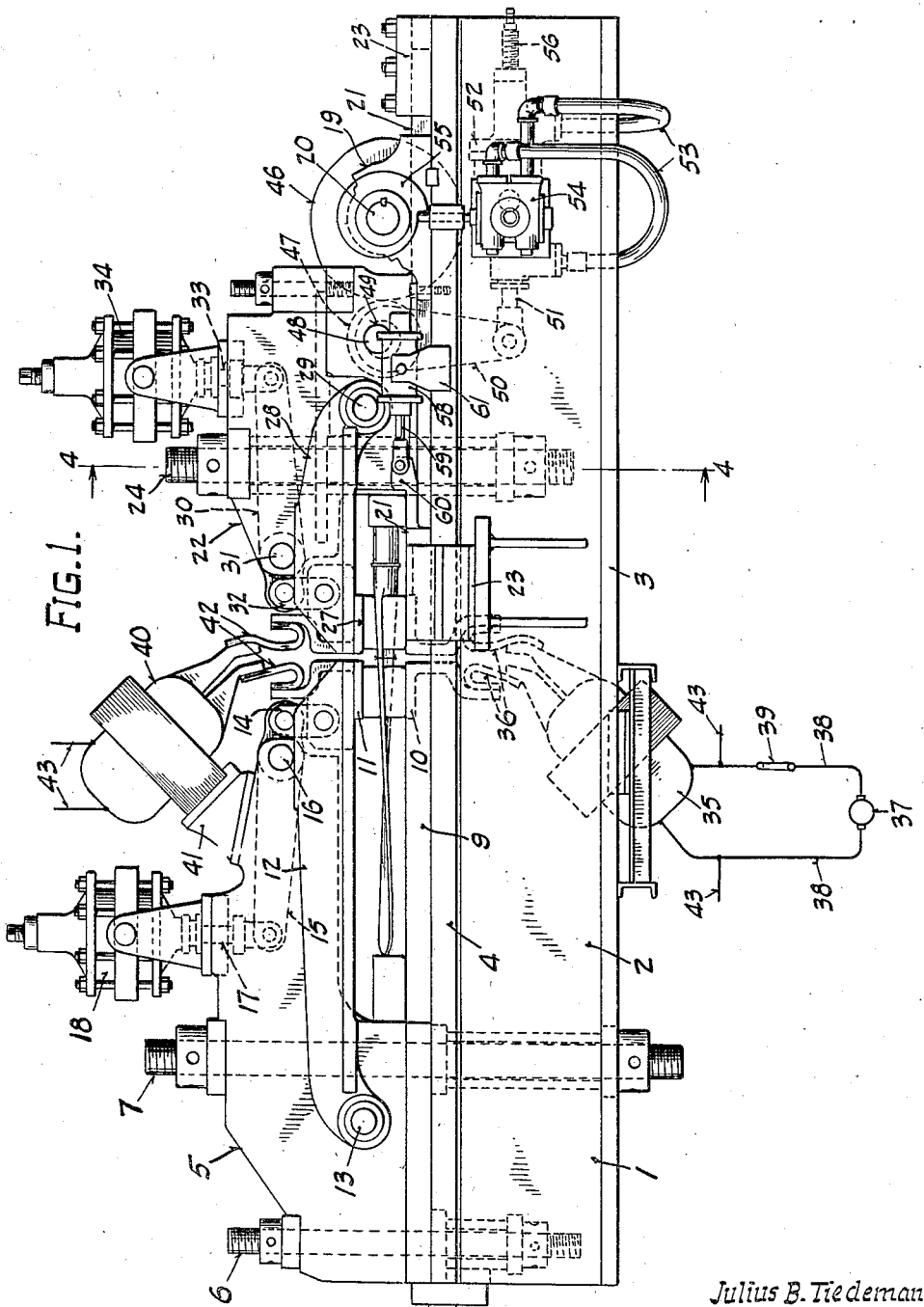
Figure 1 is a side elevation of the welding machine.
Figure 2:
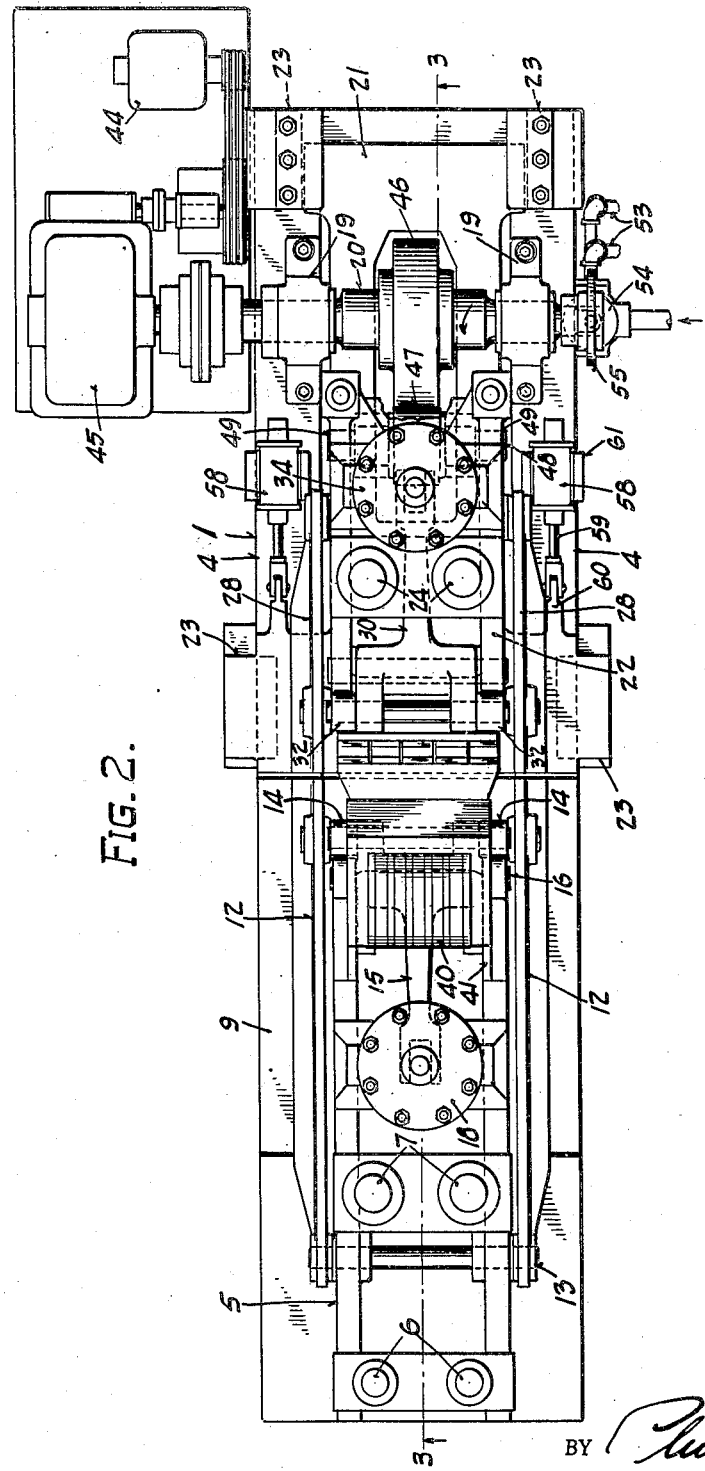
Fig. 2 is a top plan view of the welding machine.
Figure 3:
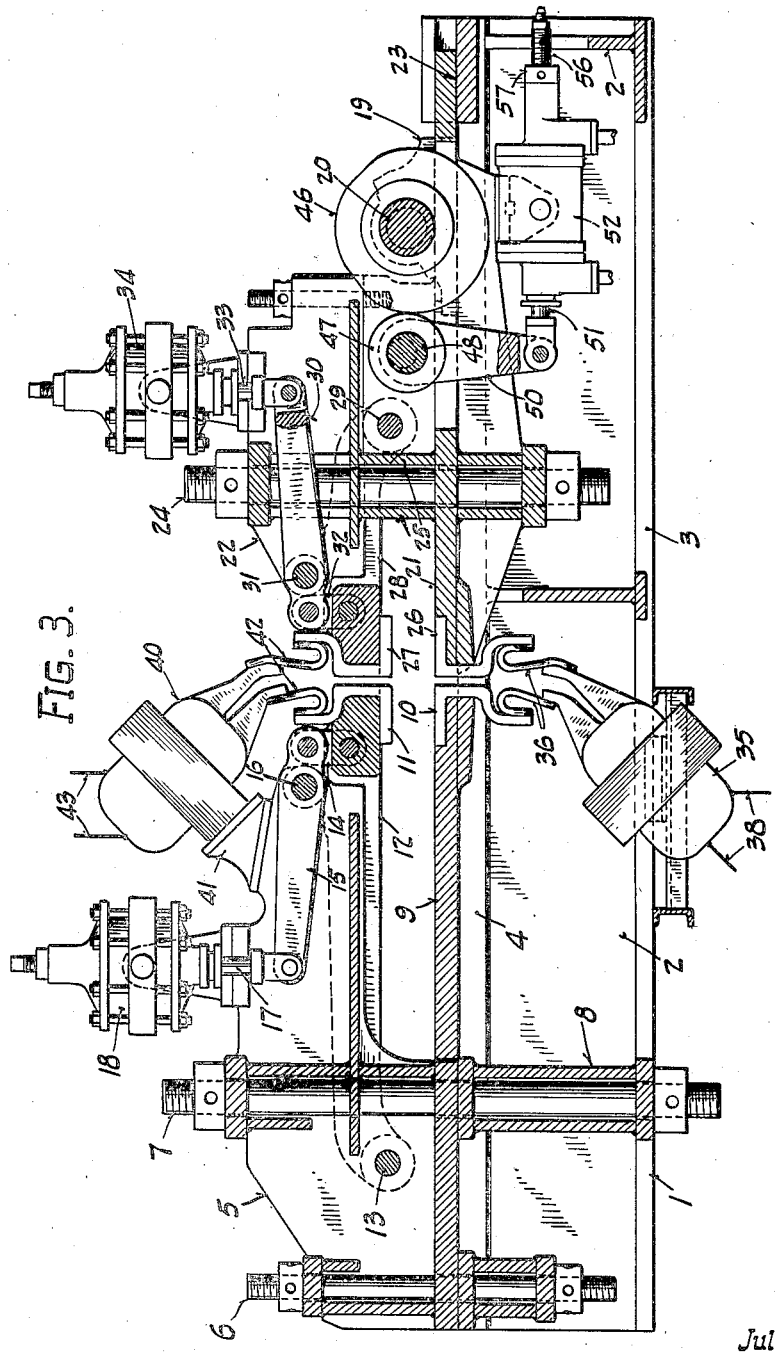
Fig. 3 is a vertical central longitudinal section taken on line 3—3 of Fig. 2.
Figure 4:
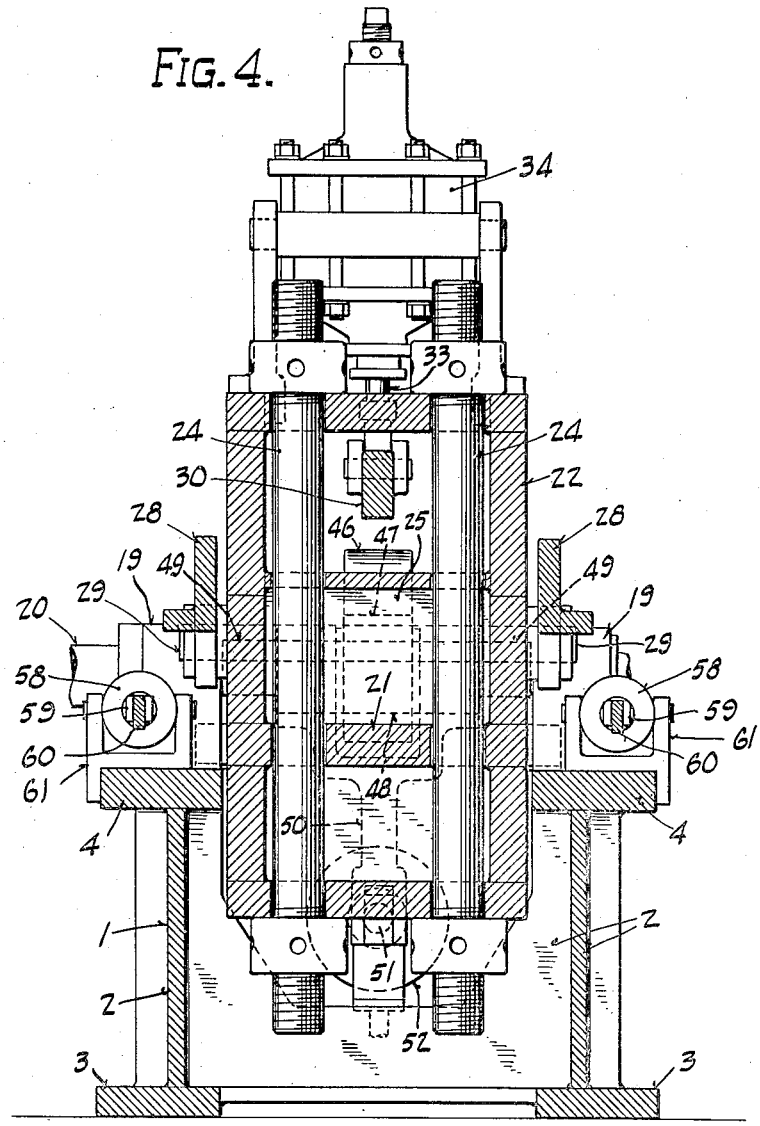
Fig. 4 is a transverse vertical section taken on line 4—4 of Fig. 1.

The welding machine has a fixed base 1 constituted of side and end plates 2 set on edge in rectangular formation and secured at the vertical meeting edges. Bottom plates 3 are welded to the lower edges of the respective plates 2 and top plates 4 are similarly welded to the upper edges of the plates 2 to provide rigidity for the base.

An upper frame member 5 is secured to the base 1 at one end by bolts 6. The bolts 7 additionally secure the frame 5 in fixed relation to the base and pass vertically through the frame 5 near its center and through the base 1 with top and bottom nuts threaded thereon. The base 1 has a cross member 8 for receiving the tie bolts 7.

A fixed welding die support 9 constituting a table top is disposed upon the top of plates 4 and extends from the frame 5 to the position of the seam cleft where it has secured thereto the lower fixed welding electrode 10. The frame 5 extends horizontally above the support 9 and in spaced relation thereto to a position somewhat short of that of the seam cleft. An upper electrode 11 is secured to the outer ends of a pair of horizontal side arms 12 extending along the opposite sides of frame 5 and pivoted thereto at 13 near the rear end thereof to provide for up and down movement of electrode 11 relative to electrode 10.

For the purpose of holding electrode 11 in the desired vertical position and for pressing the same toward electrode 10 to secure the work therebetween, the arms 12 have short vertical links 14 pivoted to their outer ends and suspending the same from the end of an operating lever 15. The lever 15 is in turn pivotally mounted at 16 upon the outer end of frame 5 and extends horizontally to have its opposite end connect with the vertical piston rod 17 of a power cylinder 18 mounted upon frame 5 near the tie bolts 7.

The right-hand end of base 1 supports fixed bearing brackets 19 carrying the drive shaft 20 and operating mechanism. Between the bracket 19 and the position of the seam cleft is mounted a lower table top support 21 and an upper frame 22, both movable longitudinally in slides 23 upon plates 4 of base 1. Vertical tie bolts 24 secure the frame 22 to the support 21 and are disposed between two vertical cross plates 25 which provide rigidity for the structure.

The support 21 extends to the position of the seam cleft where it carries a lower movable electrode 26. An upper electrode 27 is disposed above electrode 26 and adapted to move vertically relative thereto to clamp the work therebetween. The electrode 27 is secured to the free ends of a pair of horizontal arms 28 pivoted at 29 to the central portion of frame 22. The vertical position of electrode 27 is determined by an operating lever 30 which is pivoted at 31 to the frame 22 near the electrode and has its end secured to the free ends of arms 28 by links 32. The end of lever 30 opposite the links 32 is secured to the vertical piston rod 33 of power cylinder 34 mounted upon frame 22 adjacent the tie bolts 24.

The construction described provides a large space of substantial length horizontally between the respective upper and lower electrodes and frame members. The relatively long arms 12 and 28 provide for a substantially vertical movement of the upper electrodes in clamping the work upon the lower electrodes, and the employment of a high lever ratio for the operating levers 15 and 30 provides high clamping pressures with reasonably small power cylinders. The tie bolts 7 and 24 secure the parts against the clamping pressures.

Current is supplied to electrodes 10 and 26 from a suitable welding transformer 35 disposed in the base 1 and having flexible leads 36 connecting its secondary to the respective electrodes. The transformer 35 has its primary connected to a power source 37 by leads 38 in which a switch 39 is disposed.

Current is similarly supplied to electrodes 11 and 27 from a suitable welding transformer 40 supported on a bracket 41 on the top of the upper frame member 5 and having flexible leads 42 connecting its secondary to the respective electrodes. The transformer 40 has its primary connected to the leads 38 by leads 43 at a point between switch 39 and transformer 35, to supply transformer 40 with current from the source 37.

The drive for the machine comprises the main drive shaft 20 operating in suitable bearings in the fixed brackets 19 and driven by a motor 44 through suitable reducing gears 45 at one end of the shaft. The center of shaft 20 carries a cam disc 46 of substantial thickness secured thereto for applying the welding pressure to movable frame 22 and table 21. The cam 46 operates by means of a cam roller 47 or follower which is rotatably mounted on shaft 48 eccentrically journaled in bearings 49 in the frame 22. The shape of the cam 46 determines the movement of table 21 and frame 22 longitudinally of the base toward the seam cleft to bring the parts together in flashing contact and to maintain the flashing of the edges until ready for the final welding bump. This movement is illustrated in Figs. 5 and 6 in which the cam 46 is shown to have rotated nearly a complete revolution from the point of starting contact with roller 47 to the point where the edges of the work piece are ready for the final welding bump.

The purpose of mounting shaft 48 eccentrically is to provide for the rapid advance of the table 21 and frame 22 to produce the final welding of the edges of the work-piece. This is accomplished by a crank 50 secured to shaft 48 and operated by the piston rod 51 of a power cylinder 52. The power cylinder 52 is operated by compressed air, by means of the hose 53. A suitable valve 54 controls the supply of air to cylinder 52 and is operated by a trip disc 55 on the end of rotating drive shaft 20. The stroke of the piston of power cylinder 52 is governed by an adjusting screw 56 which is locked in the desired position by a nut 57 adapted to engage the rear end of the cylinder.

The operation of the power cylinder 52 in applying the final welding pressure to the work piece is illustrated in Fig. 7. The shaft 20 continues to turn and when the weld is completed, the cam portion of disc 55 operates valve 54 to return the shaft 48 to its normal position, and cam 46 continues to its starting position where it is stopped to await unloading and loading of the machine for another welding operation.

The table 21 and frame 22 are constantly biased to open position by a pair of air cylinders 58 on opposite sides of the machine. The piston rods 59 of cylinders 58 are connected to brackets 60 on table 21. The cylinders 58 are secured to brackets 61 on the base 1. The air pressure in cylinders 58 is constant and is sufficiently low to prevent possible injury to the weld if the clamping electrodes were inadvertently not released when the cam 46 and eccentric shaft 48 are released. Then upon raising of the upper electrodes 11 and 27 by cylinders 18 and 34, respectively, the cylinders 58 automatically return table 21 and frame 22 to starting position wherein roller 47 engages cam 46 at the open position for the seam cleft. The work is then removed and the machine prepared for the next welding cycle.

The welding machine of the present invention has been employed in the flash welding of sections of propeller blades end-to-end wherein a relatively long space has to be provided for receiving the workpieces. The construction of the machine provides this space and at the same time leaves the front and rear sides open for loading and unloading.

The cam drive employed is direct and positive. Where different articles requiring different amounts of burn-off and flash are to be welded, the cam 46 can be changed by replacing the removable surface blocks 62 thereon with a different set of blocks.

The machine may have various embodiments within the scope of the invention as set forth in the accompanying claims.

I claim:

1. An electric flash welding machine comprising a base, a pair of relatively movable frames supported thereon and spaced above the same, electrodes carried by said frames for conducting welding current to the work, a transformer supported on one of said frames for supplying current to the electrodes, flexible leads for conducting the current from the transformer secondary to the respective electrodes, relatively movable work supporting members on said base and disposed to support the work against vertical clamping forces of said electrodes, means to support said electrodes for substantially vertical movement relative to said frames, and means for applying clamping pressure to the work by said electrodes.

2. An electric flash welding machine comprising a base, a pair of relatively movable frames supported thereon, electrodes carried by said frames for conducting welding current to the work, a transformer supported on one of said frames for supplying current to the electrodes, flexible leads for conducting the current from the transformer secondary to the respective electrodes, relatively movable work supporting members on said base and disposed to support the work against vertical clamping forces of said electrodes, said electrodes being carried on long arms disposed substantially horizontally and having their rear ends pivoted to the respective frames to provide for substantially vertical movement of the electrodes through a short operating movement, and means to apply clamping pressure to said electrodes.

3. An electric flash welding machine comprising a base, a pair of relatively movable frames supported thereon, electrodes carried by said frames for conducting welding current to the work, a transformer supported on one of said frames for supplying current to the electrodes, flexible leads for conducting the current from the transformer secondary to the respective electrodes, relatively movable work supporting members on said base and disposed to support the work against vertical clamping forces of said electrodes, said electrodes being carried on long arms disposed substantially horizontally and having their rear ends pivoted to the respective frames to provide for substantially vertical movement of the electrodes through a short operating movement, a lever pivotally mounted on each frame and having its short arm pivotally linked to the respective electrode support, and a power cylinder mounted on each frame and having its piston connected to the long arm of the respective lever to effect raising and lowering of the electrode thereby.

4. An electric flash welding machine comprising a pair of clamping jaws carrying cooperating upper and lower electrodes adapted to clamp a workpiece therebetween, a similar pair of clamping jaws carrying cooperating upper and lower electrodes adapted to clamp a second workpiece therebetween to be welded to the first named workpiece, said clamping jaws being supported horizontally in opposed relation and presenting a long opening between their respective arms for receiving workpieces of substantial length in a direction at right angles to the seam cleft between the parts, and means outside of the extent of said space for applying clamping pressure to the respective jaws upon the workpieces while leaving the front and rear sides of said space open for the loading and unloading of workpieces to and from the machine.

5. An electric flash welding machine comprising a pair of clamping jaws carrying cooperating upper and lower electrodes adapted to clamp a workpiece therebetween, a similar pair of clamping jaws carrying cooperating upper and lower electrodes adapted to clamp a second workpiece therebetween to be welded to the first named workpiece, said clamping jaws being supported horizontally in opposed relation and presenting a long opening between their respective arms for receiving workpieces of substantial length in a direction at right angles to the seam cleft between the parts, the lower member of each jaw having a substantially horizontal upper portion spaced from the lower portion of said member and parallel to the upper member of the jaw, means upon said upper portion of each lower member for operating the corresponding upper member to clamp the work, and means for tying said lower portion and its corresponding upper portion of said lower member together at the end of the space provided for the work while leaving said space open at the front and rear for the loading and unloading of workpieces to and from the machine.

6. In an electric flash welding machine, a long narrow base adapted to provide a seam cleft transversely thereof near the center, a frame mounted on said base and secured thereto at one end, said frame having a horizontal arm extending to said seam cleft and spaced above said base to provide for the reception of a workpiece, a support for the workpiece on said base, an electrode carried by said support and another by said frame adjacent the seam cleft for clamping a workpiece therebetween and supplying welding current thereto, the upper electrode being mounted on horizontal arms pivoted to said frame adjacent the opposite end thereof, a power cylinder mounted on said frame, and a lever operated by said cylinder for raising and lowering said upper electrode and applying clamping pressure thereto.

7. In an electric flash welding machine, a long narrow base adapted to provide a seam cleft transversely thereof near the center, a frame mounted on said base and secured thereto at one end, said frame having a horizontal arm extending to said seam cleft and spaced above said base to provide for the reception of a workpiece, a support for the workpiece on said base, an electrode carried by said support and another by said frame adjacent the seam cleft for clamping a workpiece therebetween and supplying welding current thereto, the upper electrode being mounted on horizontal arms pivoted to said frame adjacent the opposite end thereof, a power cylinder mounted on said frame, a lever operated by said cylinder for raising and lowering said upper electrode and applying clamping pressure thereto, and a tie bolt securing said frame to the base at the rear end of said frame arm and adjacent said power cylinder.

8. In an electric flash welding machine, a long narrow base adapted to provide a seam cleft transversely thereof near the center, a frame mounted on said base for movement longitudinally thereof toward and away from said seam cleft, said frame having a work support table top and an upper horizontal arm parallel to said support and spaced vertically therefrom for receiving a workpiece therebetween, an electrode carried by said support and another by said horizontal arm adjacent the seam cleft for supplying welding current to the workpiece, the upper electrode being mounted on horizontal arms pivoted to said frame adjacent the opposite end thereof, a power cylinder mounted on said frame, and a lever operated by said cylinder for raising and lowering said upper electrode and applying clamping pressure thereto.

9. In an electric flash welding machine, a long narrow base adapted to provide a seam cleft transversely thereof near the center, a frame mounted on said base for movement longitudinally thereof toward and away from said seam cleft, said frame having a work support table top and an upper horizontal arm parallel to said support and spaced vertically therefrom for receiving a workpiece therebetween, an electrode carried by said support and another by said horizontal arm adjacent the seam cleft for supplying welding current to the workpiece, the upper electrode being mounted on horizontal arms pivoted to said frame adjacent the opposite end thereof, a power cylinder mounted on said frame, a lever operated by said cylinder for raising and lowering said upper electrode and applying clamping pressure thereto, and a tie bolt securing said work support and upper arm of said frame together adjacent said power cylinder.

10. In an electric flash welding machine, a base, an electrode clamping jaw mounted on said base for longitudinal movement thereon toward and away from the position of the welding seam cleft, means normally biasing said jaw away from the seam cleft, a power driven drive shaft rotatably mounted in bearings on said base to the rear of said jaw, a cam mounted on said shaft for moving said jaw toward the seam cleft as said shaft rotates, a movable member disposed between said cam and said jaw and adapted to move said jaw in response to said cam, and additional means independent of said cam to move said member and effect a rapid movement of the jaw away from the cam to apply the final welding pressure to the work.

11. In an electric flash welding machine, a base, an electrode clamping jaw mounted on said base for longitudinal movement thereon toward and away from the position of the welding seam cleft, means normally biasing said jaw away from the seam cleft, a power driven drive shaft rotatably mounted in bearings on said base to the rear of said jaw, a cam mounted on said shaft for moving said jaw toward the seam cleft as said shaft rotates, a cam follower disposed to engage said cam and eccentrically mounted in said jaw to transmit forces from said cam thereto, and means to rotate said cam follower eccentrically to apply a rapid movement to said electrode jaw at a predetermined time in the welding cycle.

12. In an electric flash welding machine, a base, an electrode clamping jaw mounted on said base for longitudinal movement thereon toward and away from the position of the welding seam cleft, a power driven drive shaft rotatably mounted in bearings on said base to the rear of said jaw, a cam mounted on said shaft for moving said jaw toward the seam cleft as said shaft rotates, a cam follower disposed to engage said cam and eccentrically mounted in said jaw to transmit forces from said cam thereto, and means operative in response to the rotation of said drive shaft to rotate said cam follower and thereby apply a rapid movement to said electrode jaw at a predetermined time in the welding cycle.

13. In an electric flash welding machine, a base, an electrode clamping jaw mounted on said base for longitudinal movement thereon toward and away from the position of the welding seam cleft, a power driven drive shaft rotatably mounted in bearings on said base to the rear of said jaw, a cam mounted on said shaft for moving said jaw toward the seam cleft as said shaft rotates, a cam follower disposed to engage said cam and eccentrically mounted in said jaw, and means to rotate said cam follower and thereby apply a rapid movement to said electrode jaw at a predetermined time in the welding cycle.

14. In an electric flash welding machine, a base, an electrode clamping jaw mounted on said base for longitudinal movement thereon toward and away from the position of the welding seam cleft, a power driven drive shaft rotatably mounted in bearings on said base to the rear of said jaw, and a cam wheel mounted on said shaft for slowly moving said jaw toward the seam cleft a predetermined distance, and means operable without further movement of the cam for then advancing said jaw at a relatively quicker rate to complete the weld.

15. In an electric flash welding machine, a fixed electrode clamping member for receiving a workpiece, a second electrode clamping member for receiving a workpiece and supported for movement toward and away from said first named member, a power driven drive shaft disposed transversely at the rear of said movable member, a cam on said shaft for moving said movable member toward said fixed member at predetermined rates which vary in accordance with the requirements of a flash welding operation, an eccentrically mounted cam follower carried by said movable member and engaging said cam, to engage said cam and transmit movement therefrom to said movable member, and means for operating the eccentric to provide a rapid movement for said movable member at a predetermined time in the welding cycle.

JULIUS B. TIEDEMANN.